(12) United States Patent
Silva (10) Patent No.: US 9,479,346 B2
(45) Date of Patent: *Oct. 25, 2016

(54) METHOD AND SYSTEM FOR WIRELESS PHONE RECORDING

(75) Inventor: Christopher Anthony Silva, Little Egg Harbor, NJ (US)

(73) Assignee: SILENTPARTNER RECORDING, LLC, Little Egg Harbor, NJ (US)

( * ) Notice: Subject to any disclaimer, the term of this patent is extended or adjusted under 35 U.S.C. 154(b) by 505 days.

This patent is subject to a terminal disclaimer.

(21) Appl. No.: 13/346,883

(22) Filed: Jan. 10, 2012

(65) Prior Publication Data
US 2012/0172004 A1 Jul. 5, 2012

Related U.S. Application Data

(63) Continuation-in-part of application No. 13/276,648, filed on Oct. 19, 2011, now Pat. No. 9,088,427, which is a continuation-in-part of application No. 13/164,104, filed on Jun. 20, 2011, now abandoned, which is a continuation-in-part of application No. 13/037,531, filed on Mar. 1, 2011, now abandoned, which is a continuation-in-part of application No. 12/881,315, filed on Sep. 14, 2010, now abandoned.

(60) Provisional application No. 61/365,558, filed on Jul. 19, 2010.

(51) Int. Cl.
*H04L 12/58* (2006.01)
*H04L 12/18* (2006.01)
*B44C 1/22* (2006.01)

(52) U.S. Cl.
CPC .............. *H04L 12/1831* (2013.01); *B44C 1/22* (2013.01)

(58) Field of Classification Search
CPC ......... H04W 4/12; H04W 4/00; H04W 4/22; H04W 88/02; H04W 84/18; H04W 12/06; H04W 4/08; H04W 68/00; H04W 52/0251; H04W 76/007; H04W 52/0254; H04W 76/005; H04W 8/04; H04W 8/18; H04M 3/56
USPC ...... 455/416, 414.1, 405, 412.1, 404.1, 419, 455/556.1, 567; 379/202.01, 201.03, 379/218.01, 221.14
See application file for complete search history.

(56) References Cited

U.S. PATENT DOCUMENTS

| | | | |
|---|---|---|---|
| 8,130,913 B1* | 3/2012 | Panchbudhe et al. | 379/68 |
| 2005/0141674 A1* | 6/2005 | Brown | H04M 3/2281 379/32.01 |
| 2006/0287014 A1* | 12/2006 | Matsuura et al. | 455/575.2 |
| 2007/0211876 A1* | 9/2007 | Othmer et al. | 379/201.01 |
| 2009/0117879 A1* | 5/2009 | Pawar et al. | 455/412.1 |
| 2010/0115090 A1* | 5/2010 | Petersen et al. | 709/224 |

* cited by examiner

*Primary Examiner* — Fred Casca
(74) *Attorney, Agent, or Firm* — Porzio, Bromberg & Newman, P.C.

(57) ABSTRACT

The present invention related to a method for recording a mobile phone call and mobile phone recording system for recording audio from mobile phone calls. An external call is established with the mobile phone. A connection is made between the wireless phone and an audio capture and broadcast device, such as a Bluetooth device. The call recorder application can instruct the Bluetooth device to forward copies of transmit and receive audio back to the call recording application. The internal call can be tagged with an identification. Thereafter, the audio, and data such as SMS and MMS, can be forwarded to a third party database for storage or stored locally for the end user to play back on the phone or transfer to an external device using USB, wireless, or similar data connection.

20 Claims, 5 Drawing Sheets

METHOD AND SYSTEM FOR WIRELESS PHONE RECORDING

CROSS REFERENCE TO RELATED APPLICATION

This application is a continuation-in-part of U.S. patent application Ser. No. 13/276,648 filed Oct. 19, 2011 now U.S. Pat. No. 9,088,427, which is a continuation-in-part of Ser. No. 13/164,104, filed Jun. 20, 2011 now abandoned, which is a continuation-in-part of U.S. patent application Ser. No. 13/037,531 filed Mar. 1, 2011 now abandoned which is a continuation-in-part of U.S. patent application Ser. No. 12/881,315 filed Sep. 14, 2010 now abandoned which claims the benefit of U.S. Provisional Patent Application No. 61/365,558, filed Jul. 19, 2010, the entireties of all of which are hereby incorporated by reference into this application.

BACKGROUND OF THE INVENTION

1. Field of the Invention

The present invention generally relates to data recording a wireless phone call conversation in which an external call is conferenced to, or with, an internal call on the wireless phone and audio from the internal call can be captured and stored.

2. Description of Related Art

Systems which record conversations of calls are known. U.S. Pat. No. 7,502,448 directed to an apparatus and system for transmitting, receiving and recording two-way conversation data over a wireless network via a wireless communication device. A memory is coupled to the wireless communication device for storing two-way conversation data in digital form. A device interface transfers conversation information from the wireless communication device to a remote storage device. A user interface is configured to allow a user of the wireless communication device to access, by way of a wireless network, the two-way conversation data stored in the remote storage device. The user interface includes a plurality of data management functions that allows the user of the wireless communication device to manage, by way of the wireless network, the two-way conversation data stored in the remote storage device. The data management function includes functions for editing and translating the two-way conversation data stored in the remote storage device, such as searching, linking, downloading, editing, playing back, converting, sending, archiving, and deleting the two-way conversation data stored in the storage location.

WO 2009/040706 is related to conversation recording on mobile telephones with subsequent transfer to a central database. A telecommunication system for managing telecommunication data includes a mobile telephone communication device that is able to make and receive telephone calls via a public telephone network and which has a storage arrangement for storing a telephone communication during a telephone session. A processing facility processes the telephone communication. A transferring means transfers the stored telephone communication from the wireless telephone communication device to the processing facility. The transfer can take place automatically, immediately after the telephone session ends or at a later time, as determined by a user of the telephone. Also, the user can decide whether or not to delete the stored telephone communication. If the user decides to transfer the telephone communication immediately after the telephone session ends, this will be effected via a communication channel using the cellular public telephone network and gateway, and a data transmission.

It is desirable to provide a method a system for wireless phone recording in which audio can be expeditiously captured and stored as an audio file continuously or on demand as necessary at the wireless phone.

SUMMARY OF THE INVENTION

The present invention generally provides a method for recording a wireless phone call and wireless phone recording system for recording audio from wireless phone calls. The wireless phone recording system can have an interface that is seamless and undetectable by the user so that the system can be used for covert applications, such as for use by undercover law enforcement personnel, or the system can be used as a business security tool installed on all wireless phones issued by an organization.

The wireless phone recording system can include a call-recording application. The call-recording application on a wireless phone can be configured to run at all times, so that all communication on the wireless phone can be recorded. Alternatively, the call-recording application can be used as an on-demand application so that a user can start and stop an audio recording as necessary.

In the method of the present invention, an external call is established with the wireless phone. The call recording application establishes an independent, internal call using loopback or similar application, and conferences the internal call to the external call. This conference may be made via the phone's API, or simply by nature that both calls are using the same microphone and speaker devices on the phone for the audio interface to the user. In one embodiment, a wireless loopback, for example using Bluetooth, is established. An application of a Bluetooth device runs on the wireless phone. The application of the Bluetooth device connects to Bluetooth communication services of the wireless phone. Audio of the internal call can be captured and stored at the wireless phone by various methods, including, but not limited to, capture of the packets transmitted between endpoints of the internal call, or via audio output software interface on either of the endpoint applications involved in creating the internal call Thereafter, the audio can be forwarded to a third party database for storage. The call-recording application can produce an audio file that can be used for litigation purposes, conversation verification, and many other purposes to avoid a hearsay situation. The call-recording application can also be used in organizations where they can be required to record all calls in order to comply with legal or regulatory statue.

In one embodiment, a connection is made between the wireless phone and an audio capture and broadcast device, such as a Bluetooth device. The call recorder application can instruct the Bluetooth device to forward copies of transmit and receive audio back to the call recording application.

Alternatively, the user can set a call recording application on the mobile phone to deliver the audio only when desired. In one embodiment, a user interface allows a user to enter a predetermined identification which can be tagged to the internal call prior to transfer to the third-party database for subsequent expeditious identification of the call. This information can be optionally selected prior to any recording, chosen at the end of the recording, or entered at the beginning or end of the recording if the desired data element is not present in the predetermined list. The user can select calls to be recorded based on one or more conditions, such as, for example, dialed number information, caller ID information, calls within a certain radius of a GPS location, incoming status and outgoing status.

In one embodiment, the user interface allows the wireless phone to be used as a recorder by recording a conversation with a speaker phone microphone. The user can enter a predetermined or user entered identification which can be tagged to the recorded conversation prior to transfer to the third-party database for subsequent expeditious identification of the recording.

In one embodiment, a remote administrator can initiate recording at the mobile phone. A device of the mobile phone, such as, for example, a microphone, camera or alternate device connected with a wired or wireless connection can be activated to initiate recording. The remote administrator can initiate the recording, for example, by using a short message service (SMS) message, establishing a call with the mobile phone and supplying of a code, establishing an Internet connection, sensing a Global Positioning Service (GPS) location, or sensing an environment of the user. For example, the environment of the user can be related to sensing the speed of movement of the mobile phone, sensing a shock to the mobile phone, sensing a temperature of the mobile phone, sensing a heart rate of a user of the mobile phone and sensing availability of a network of the mobile phone. The third-party database can also capture short message service (SMS) messages and multimedia messaging (MMS) messages. The third-party database can then capture the audio, any recorded audio, and any data or messages presented independently of the audio and store the data for future use.

The invention will be more fully described by reference to the following drawings.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
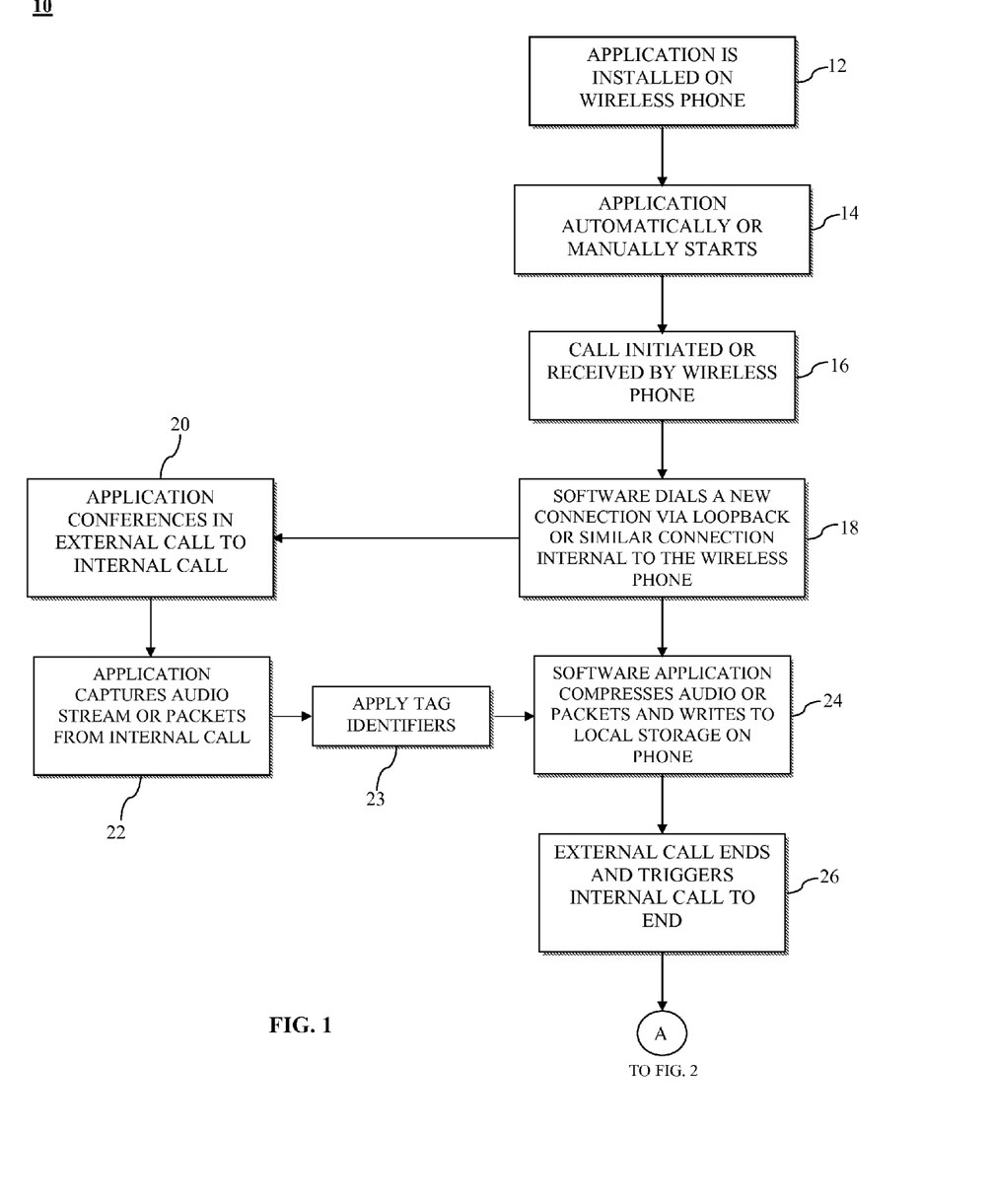
FIG. 1 is a flowchart of a method of recording a wireless phone call conversation in accordance with an embodiment of the present invention.

FIG. 1 is a flowchart 10 that shows the process of recording audio from a wireless phone call conversation, in accordance with the teachings of the present invention. In block 12, a call-recording application can be installed on a wireless phone, such as a mobile phone. In block 14, the call-recording application can start either automatically or manually. In one embodiment, the user can select calls to be recorded based on one or more of the following: dialed number information; caller ID information; calls within a certain radius of a GPS location; incoming status; and outgoing status. In one embodiment, the mobile phone can be used as a recorder by recording a conversation at the mobile phone with a speaker phone microphone. The call-recording application can include an interface for the user or can be undetectable to the user. In block 16, an external call to another phone can be initiated or received by the wireless phone including the call-recording application. In block 18, the call-recording application can establish a connection via a loopback or other similar connection internal to the wireless phone to set up an independent internal call to the wireless phone. Accordingly, the call-recording application allows the wireless phone to communicate with itself without external network connectivity.

In one embodiment, a wireless loopback, for example using Bluetooth, is established in the wireless phone. Accordingly, the call-recording application allows the wireless phone to communicate with itself without external network connectivity.

In block 20, the call-recording application can conference the external call with the internal call via the phone's API, or simply by nature that both calls are using the same microphone and speaker devices on the phone for the audio interface to the user. In block 22, the call-recording application can capture an audio stream via either application endpoint which are conferenced to the internal call or audio packets from the internal call, or a similar method for capturing audio data. In block 22, any data or messages presented independently of the audio is delivered to the recording server. For example, the messages can include short message service (SMS) messages and multimedia messaging (MMS) messages. It will be appreciated that other message types using for example text, pictures or video utilized by the mobile phone can be delivered to the recording server in accordance with the teachings of the present invention. The audio data can be compressed into a waveform or similar digital audio file in audio format. In block 23, the user can enter a predetermined identification or identification entered manually prior or subsequent to the recording which can be tagged to the recorded conversation prior to transfer to the centralized recording server for subsequent expeditious identification. In block 24, the call-recording application can compress the audio or audio packets and can then write the compressed data to local storage on the wireless phone. In block 26 the external call can end and the ending of the external call can trigger the internal call to end.

Figure 2:
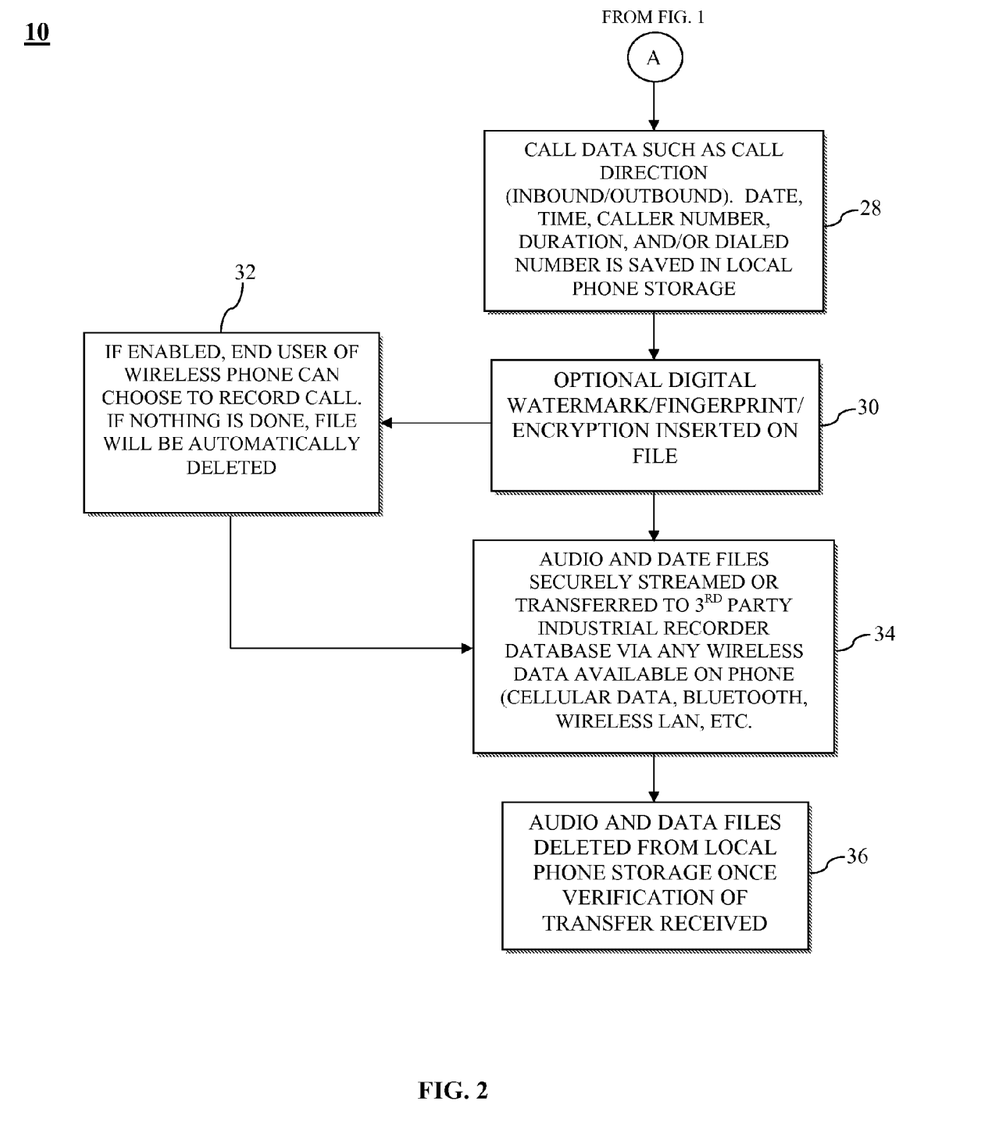
FIG. 2 is a continuation of the flowchart of FIG. 1.

With reference to FIG. 2, flowchart 10 can proceed from A. In block 28, call data, such as, for example, call direction inbound or outbound, date, time, caller number, duration, dialed number, GPS location, SMS messages, MMS messages or any other data present on the mobile phone or additional attributes about the phone and/or call can be saved in the local storage on the wireless phone and can be associated with the one or more files captured for the audio stream or audio packets from the internal call. In block 30, a digital watermark, fingerprint, or encryption can be associated with the one or more files captured for the audio stream from the application endpoints which are conferenced to the internal call or audio packets from the internal call. In block 32, it is determined from the interface if the end user chooses to record the call, if the end user does not choose to record the call, the one or more files for the captured audio stream or audio packets from the internal call can be automatically deleted. In block 34, the one or more files for the captured audio stream or audio packets from the internal call can be securely streamed or transferred to one or more third-party recorder databases via any wireless data connection available on the wireless phone, such as, for example, cellular data, Bluetooth, wireless local area network, or other connections. In block 36, the one or more audio and data files can be deleted from local storage of the wireless phone once it is verified that the transfer was received by the one or more third-party recorder databases. Alternatively, the one or more audio and data files can be retained in the local storage of the wireless phone for catalog and playback.

Figure 3:
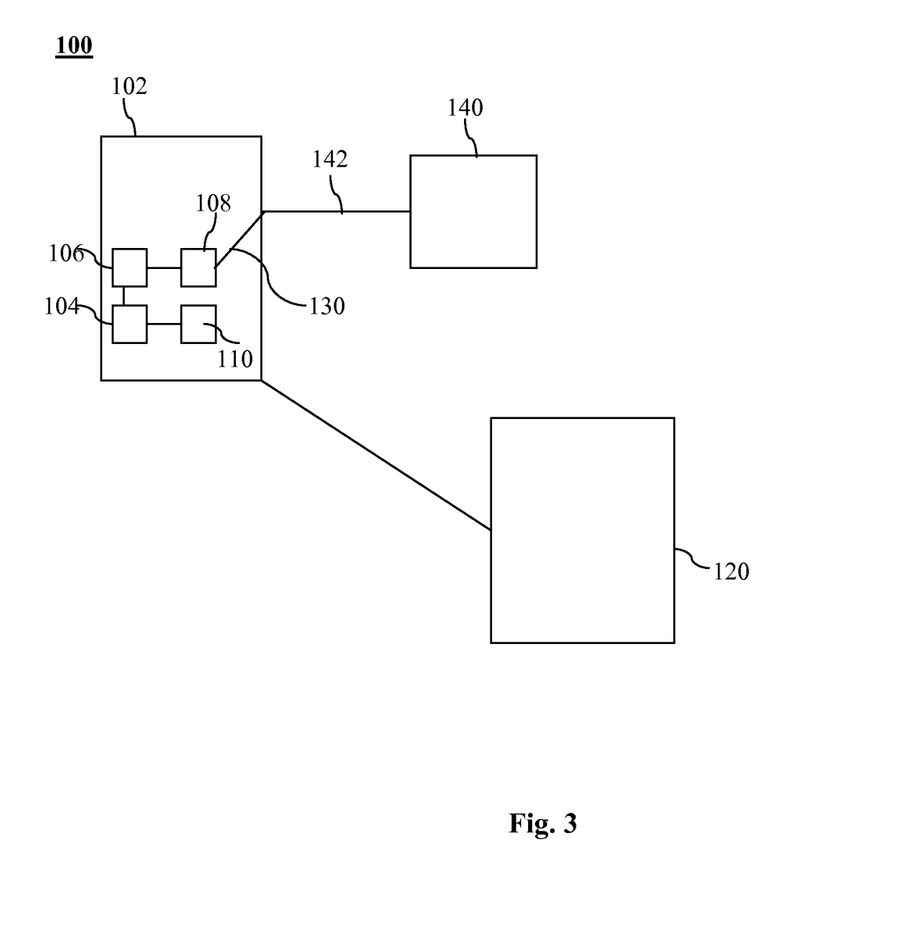
FIG. 3 is a schematic diagram of system for recording a wireless phone call conversation.

FIG. 3 is a schematic diagram of system for recording a phone call 100. Wireless phone 102 includes call-recording application 104, memory storage module 106 and local storage 108. Preferably, wireless phone 102 is a mobile phone. Phone 120 can establish a call to wireless phone 102 or wireless phone 102 can receive a call from phone 120. Phone 120 can be either a landline connected telephone or a mobile phone. Call-recording application 104 establishes internal call 110 and conference the internal call 110 to the external call via the phone's API, or simply by nature that both calls are using the same microphone and speaker devices on the phone for the audio interface to the user. Call-recording application 104 can capture an audio stream from the application endpoints which are conferenced to the internal call or packets from internal call 110, compress the audio stream or packets and store the one or more files for captured audio stream or audio packets from the internal call in local storage 108 using storage module 106. Call-recording application 104 can determine call data and associate the call data with the one or more files for the captured audio stream or audio packets from the internal call. Call-recording application 104 can include software for digital watermarking, fingerprinting and encryption. One or more audio and/or data files 130 from call-recording application 104 can be securely streamed or transferred to the one or more third-party recorder databases 140 over wireless connection 142. Call recording application 104 can tag an identification to the one or more audio and/or data files 130.

Figure 4:
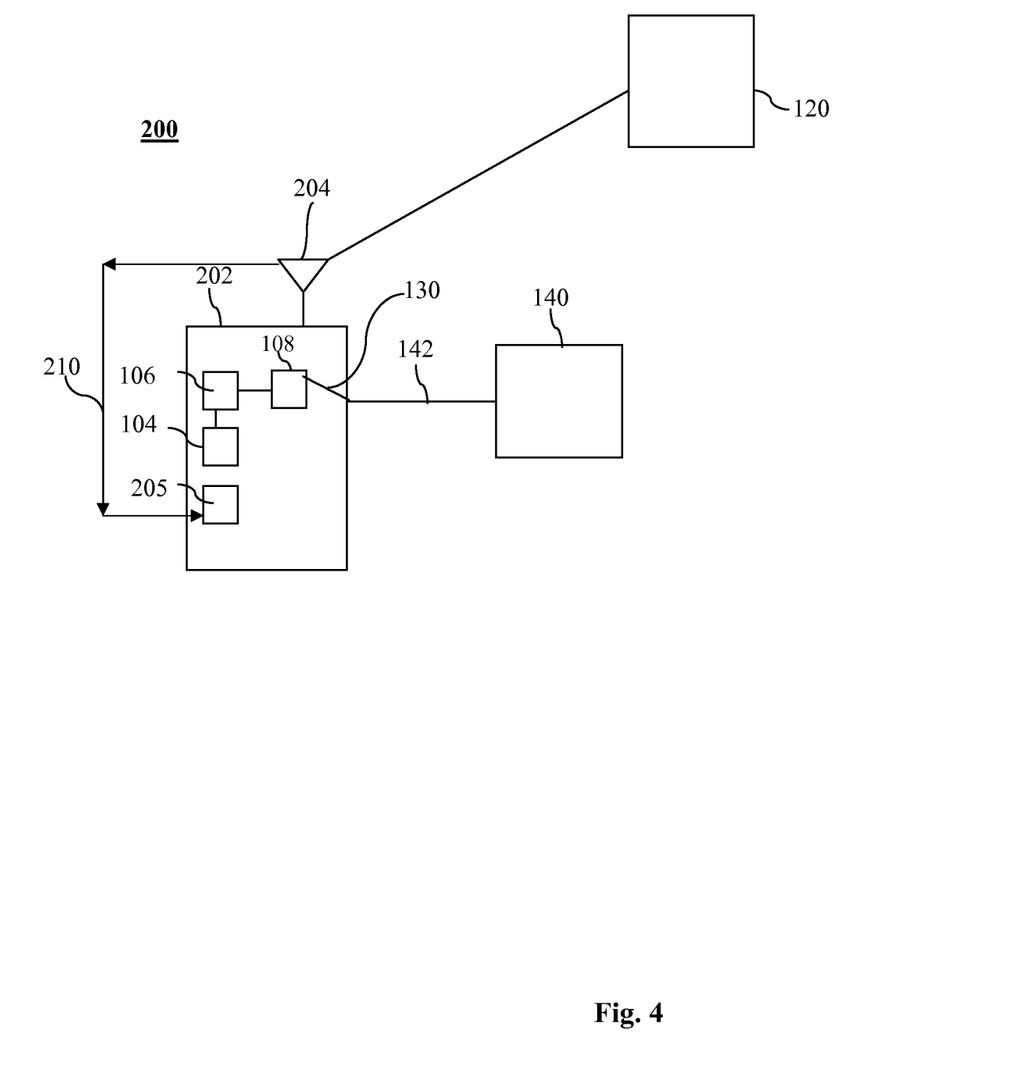
FIG. 4 is a schematic diagram of system for recording a wireless phone call conversation in an alternate embodiment.

FIG. 4 is a schematic diagram of system for recording a phone call 200. The application of the Bluetooth device connects to Bluetooth communication services of the wireless phone. Wireless phone 202 includes call-recording application 104, memory storage module 106 and local storage 108. Preferably, wireless phone 202 is a mobile phone. Wireless phone 202 can include Bluetooth device 204 for providing Bluetooth communication services. Bluetooth device 204 can be an antenna. Bluetooth application 205 communicates with call recording application 104. Phone 120 can establish a call to wireless phone 202 or wireless phone 202 can receive a call from phone 120. Phone 120 can be either a landline connected telephone or a mobile phone. Call-recording application 104 establishes loopback connection 210 between Bluetooth application 205 and Bluetooth device 204 to conference the external call to loopback connection 210. Bluetooth application 205 can capture an audio stream which is conferenced to loopback connection 210. Call recording application 104 can convert the captured audio data from Bluetooth application 205 into pulse code modulation (PCM) packets. Call recording application 104 can compress the audio stream or pulse code modulation (PCM) packets and store the one or more files for captured audio stream or audio packets from the internal call in local storage 108 using storage module 106. Call-recording application 104 can determine call data and associate the call data with the one or more files for the captured audio stream or audio packets from the internal call. Call-recording application 104 can include software for digital watermarking, fingerprinting and encryption. One or more audio and/or data files 130 from call-recording application 104 can be securely streamed or transferred to the one or more third-party recorder databases 140 over wireless connection 142. Call recording application 104 can tag an identification to the one or more audio and/or data files 130.

Figure 5:
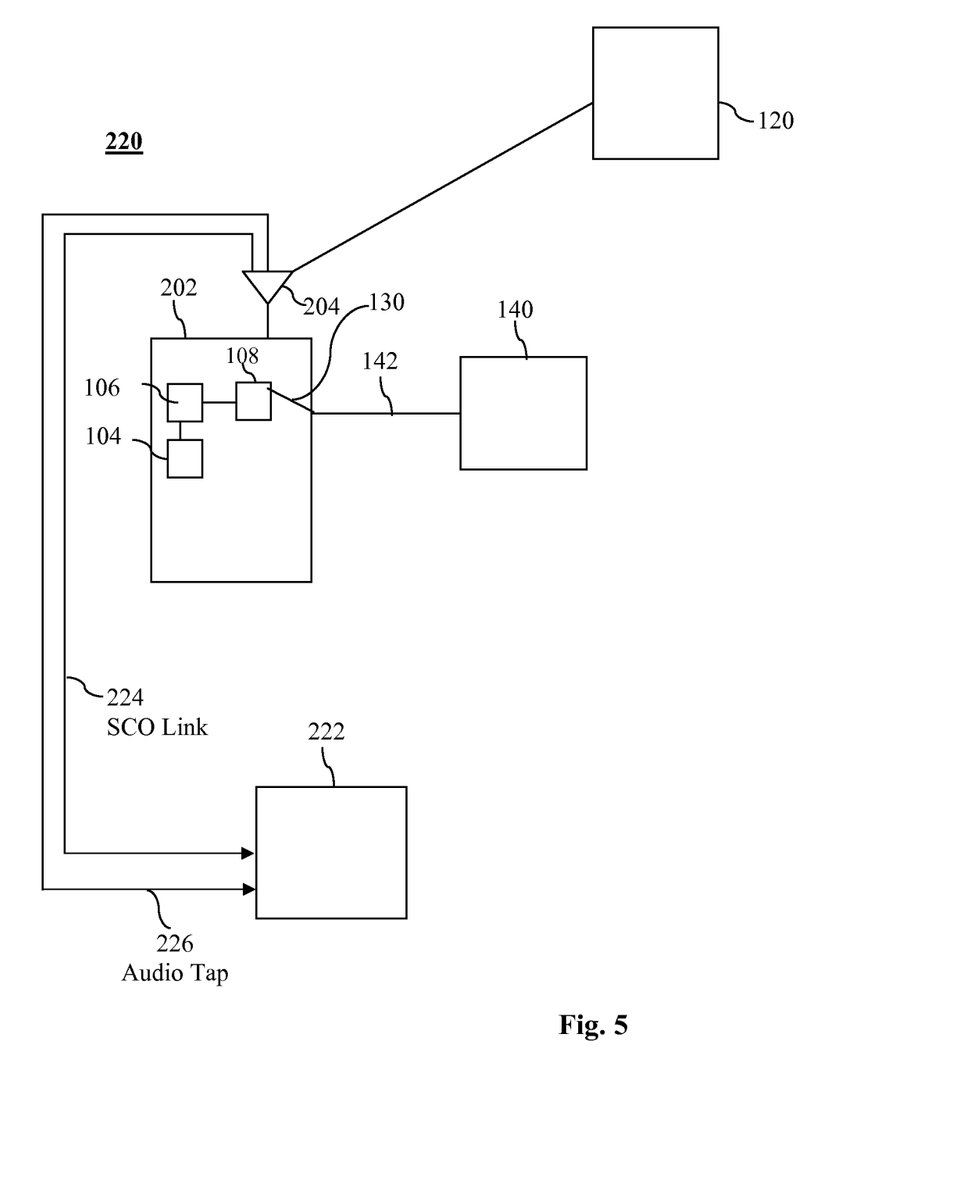
FIG. 5 is a schematic diagram of system for recording a wireless phone call conversation in an alternate embodiment.

FIG. 5 is a schematic diagram of system for recording a phone call 220. Wireless phone 202 includes call-recording application 104, memory storage module 106 and local storage 108. Preferably, wireless phone 202 is a mobile phone. Wireless phone 202 can include Bluetooth device 204 for providing Bluetooth communication services. Bluetooth device 204 can be an antenna. Bluetooth device 204 connects to headset or speaker device 222 via synchronous connection oriented (SCO) link 224. Bluetooth device 204 can also connect to headset or speaker device 222 via audio control link 226. For example, headset or speaker device 222 can be a Bluetooth device.

Phone 120 can establish a call to wireless phone 202 or wireless phone 202 can receive a call from phone 120. Phone 120 can be either a landline connected telephone or a mobile phone. Call recording application 104 can establish a connection with headset or speaker device 222. Call-recording application 104 instructs headset or speaker device 222 to send duplicate copies of transmit and receive audio to Bluetooth device 204 via audio control link 226 and synchronous connection oriented (SCO) link 224 for receipt at call recording application 104. Call recording application 104 can convert the captured audio data from headset or speaker device 222 into pulse code modulation (PCM) packets. Call recording application 104 can compress the audio stream or pulse code modulation (PCM) packets and store the one or more files for captured audio stream or audio packets from the internal call in local storage 108 using storage module 106. Call-recording application 104 can determine call data and associate the call data with the one or more files for the captured audio stream or audio packets from the internal call. Call-recording application 104 can include software for digital watermarking, fingerprinting and encryption. One or more audio and/or data files 130 from call-recording application 104 can be securely streamed or transferred to the one or more third-party recorder databases 140 over wireless connection 142. Call recording application 104 can tag an identification to the one or more audio and/or data files 130.

It should be understood, of course, that the foregoing relates to exemplary embodiments of the invention and that modifications can be made without departing from the spirit and scope of the invention as set forth in the following claims.

What is claimed is:

1. A method for recording a phone call comprising the steps of:
   establishing an external call between a first phone and a second phone, the first phone is a wireless device;
   establishing an internal call from a call recording application on the first phone to the call recording application on the first phone;
   establishing an internal connection between a software application of a Bluetooth device on the first phone and the call recording application on the first phone;
   establishing a wireless or an internal connection from the software application of the Bluetooth device to the microphone and speaker on the first phone when no physical Bluetooth devices are present or establishing a wireless connection from the first phone to a physical Bluetooth device, wherein the first phone includes a Bluetooth antenna, the Bluetooth antenna communicates with an external Bluetooth headset or speaker phone over a synchronous connection oriented (SCO) link or an audio control link; conferencing the external call to the internal call;

capturing audio data from the microphone and speaker via the software application of the Bluetooth device;

storing the captured audio data with the call recording application; and associating call data with the audio data wherein the call data is selected from one or more of direction of the call, date of the call, time of the call, caller number of the call, global positioning system (GPS) Location, duration of the call, dialed number of the call, short message service (SMS) messages, multimedia messaging (MMS) messages, and any other data that is present on the phone and any other data related to the phone and/or call.

2. The method of claim 1 wherein the audio data is stored in local memory storage on the first phone.

3. The method of claim 1 further comprising the step of compressing the audio data into a waveform, or similar digital audio file, in audio format.

4. The method of claim 1 further comprising the step of encrypting the audio data.

5. The method of claim 1 further comprising the step of fingerprinting the audio data.

6. The method of claim 1 further comprising the step of transferring stored audio data to a third party recorder database.

7. The method of claim 1 further comprising the step of deleting the audio data from the local memory storage the on the first phone after verification of the transfer of the stored audio.

8. The method of claim 7 wherein the step of transferring the stored audio recording is performed wirelessly.

9. The method of claim 1 wherein the step of conferencing is performed automatically based on one or more of dialed number information, caller ID information, calls within a certain radius of a global positioning system (GPS) location, incoming status and outgoing status.

10. A system for recording a phone call comprising:
means for establishing an external call between a first phone and a second phone, the first phone is a wireless device;
means for establishing an internal call from a call recording application on the first phone to the call recording application on the first phone;
means for establishing an internal connection between a software application of a Bluetooth device on the first phone and the call recording application on the first phone;
means for establishing a wireless or an internal connection from the software application of the Bluetooth device to the microphone and speaker on the first phone;
means for conferencing the internal call to the external call via the phone's application programing interface (API) or by both calls use the same hardware simultaneously;
means for capturing audio data from the microphone and speaker via a capture of the audio packets transmitted between the first phone and the microphone and the speaker or via software capturing the pulse code modulation (PCM) audio on the first phone;
means for storing the captured audio data with the call recording application via storing the captured audio file utilizing local storage of the first phone; and means for associating call data with the audio data wherein the call data is selected from one or more of direction of the call, date of the call, time of the call, caller number of the call, global positioning system (GPS) Location, duration of the call, dialed number of the call, short message service (SMS) messages, multimedia messaging (MMS) messages, and any other data that is present on the phone and any other data related to the phone and/or call.

11. The system of claim 10 further comprising:
means for tagging said external call with an identification.

12. The method of claim 1 wherein said step of conferencing a recording server is performed automatically.

13. The method of claim 1 wherein the step of conferencing is performed automatically based on one or more of dialed number information, caller ID information, calls within a certain radius of a global positioning system (GPS) location, incoming status and outgoing status.

14. The method of claim 1 wherein the step of conferencing is initiated remotely.

15. The method of claim 1 wherein the step of recording is initiated by a short message service (SMS) message, establishing a call with the mobile phone and supplying of a code, establishing an Internet connection, sensing a Global Positioning Service (GPS) location, or sensing an environment of the user.

16. The method of claim 15 wherein the sensing an environment of a user comprises one or more of:
sensing the speed of movement of the mobile phone;
sensing a shock to the mobile phone;
sensing a temperature of the mobile phone;
sensing a heart rate of a user of the mobile phone; and
sensing availability of a network of the mobile phone.

17. The system of claim 10 further comprising:
means for capturing short message service (SMS) messages and/or multimedia messaging (MMS) messages, and
means for forwarding the captured messages independent of the audio data to the means for storing.

18. A system for recording a phone call comprising:
means for establishing an external call between a first phone and a second phone, the first phone is a wireless device;
means for establishing an internal call from a call recording application on the first phone to the call recording application on the first phone;
means for establishing an internal connection between a software application of a Bluetooth device on the first phone and the call recording application on the first phone;
means for establishing a wireless connection from the first phone to a physical Bluetooth device, wherein the first phone includes a Bluetooth antenna, the Bluetooth antenna communicates with an external Bluetooth headset or speaker phone over a synchronous connection oriented (SCO) link or an audio control link;
means for conferencing the internal call to the external call via the phone's application programming interface (API), or by both calls use the same hardware simultaneously;
means for capturing audio data from the microphone and speaker via a capture of the audio packets transmitted between the first phone and the microphone and the speaker or via software capturing the pulse code modulation (PCM) audio on the first phone;
means for storing the captured audio data with the call recording application via storing the captured audio file utilizing local storage of the first phone and means for associating call data with the audio data wherein the call data is selected from one or more of direction of the call, date of the call, time of the call, caller number of the call, global positioning system (GPS) Location, duration of the call, dialed number of the call, short message service (SMS) messages, multimedia messaging (MMS) messages, and any other data that is present on the phone and any other data related to the phone and/or call.

19. The system of claim 18 further comprising:

means for capturing short message service (SMS) messages and/or multimedia messaging (MMS) messages, and means for forwarding the captured messages independent of the audio data to the means for storing.

20. The system of claim 18 further comprising:

means for tagging said external call with an identification.

\* \* \* \* \*